3,450,117
INTERNAL COMBUSTION ENGINE AIR FILTERS

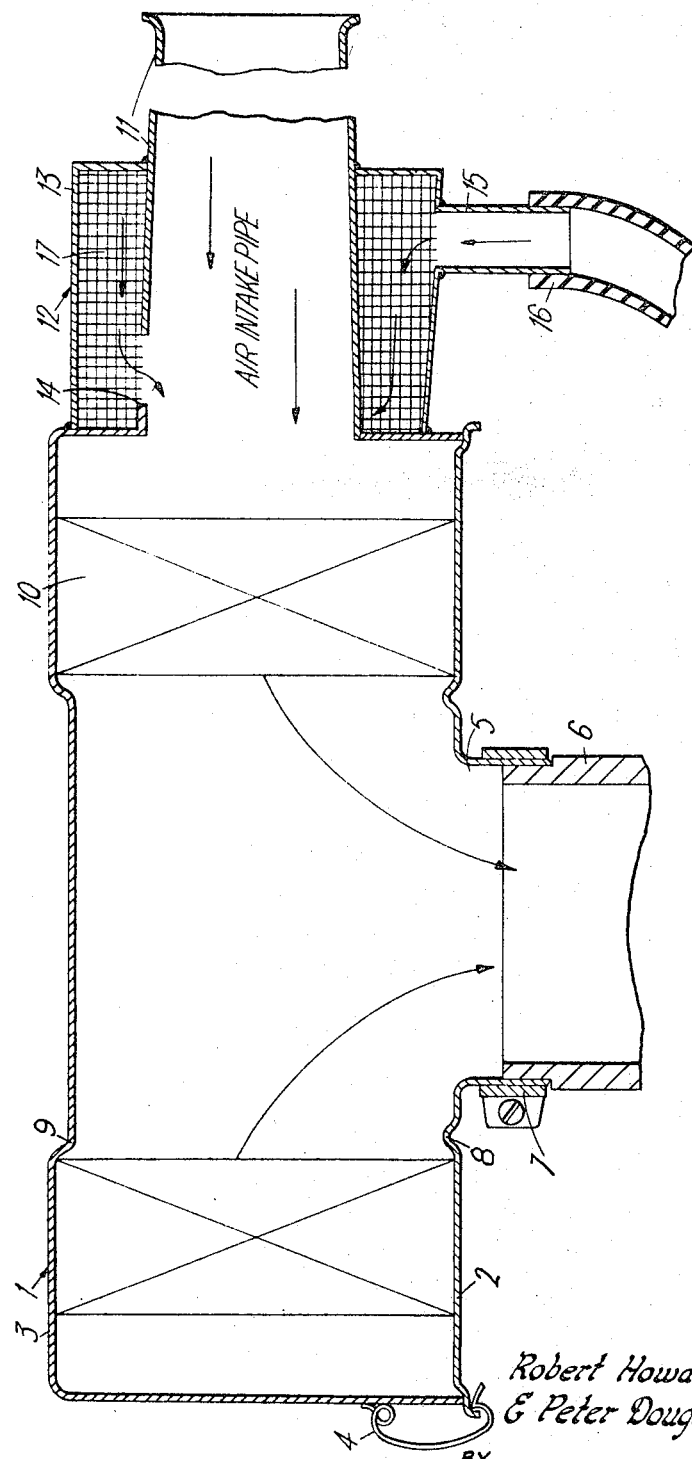

Robert Howard McHattie, Harlington, near Dunstable, and Peter Douglas Greening, Leighton, Buzzard, England, assignors to General Motors Corporation, Detroit, Mich., a corporation of Delaware
Filed Nov. 28, 1967, Ser. No. 691,677
Claims priority, application Great Britain, Dec. 1, 1966, 53,763/66
Int. Cl. F02f 9/02
U.S. Cl. 123—119                                      4 Claims

ABSTRACT OF THE DISCLOSURE

In order to reduce atmospheric pollution by exhaust emission, a condenser chamber is formed around the intake conduit of an air cleaner and communicates with the intake conduit by an opening, another opening in the condenser chamber being connected to the conduit by which crankcase blowby fumes are extracted from the crankcase; the condensing chamber is preferably packed with steel wool or like material.

This arrangement facilitates the condensation of the oil vapour in the fumes, the condensed oil being permitted to drain back to the crankcase. The arrangement also effects a desirable reduction in "hiss" in the air cleaner.

---

This invention relates to air filters for internal combustion engines, and in particular to air filters which include a filter element made of paper or like sheet filter material.

In order to reduce atmospheric pollution by the emission of incompletely burnt fuel and other hydrocarbon vapours from internal combustion engines it is common to provide a passage by which fumes from the engine crankcase (commonly referred to as "blowby" fumes), consisting of incompletely burnt fuel-air mixture, and oil vapour, are delivered to the inlet side of the engine air filter so that they are returned for combustion with the air which passes from the air filter into the engine air intake manifold.

A problem which arises with such an arrangement is that vaporised oil in the fumes from the crankcase tends to condense on the filter element and may be deposited in such a quantity that it restricts the passage of air through the filter element, particularly when the latter is made of paper or like sheet filter material and thereby unfavourably reduces the amount of air available for admixture with the fuel.

In an internal combustion engine air filter according to the invention, a passage by which crankcase fumes are conveyed from the engine to the inlet side of the air filter element has interposed therein a chamber arranged to condense vaporised oil from said fumes.

Preferably the condensor chamber has therein an opening by which condensed oil can be returned to the engine.

The condensor chamber is preferably formed around the air intake conduit of the air filter, the intake air thereby assisting in the cooling of the condensor chamber and facilitating the condensation of the vaporised oil.

The condensor chamber may be of any convenient shape and is preferably filled with wire mesh to assist the condensation of the vapours.

The scope of the invention is defined by the appended claims; and the invention and the method by which it is to be performed are hereinafter particularly described with reference to the accompanying drawings in which the single figure is a vertical section through an internal combustion engine air filter according to the invention.

The drawing shows an air filter 1 having a filter housing consisting of a base 2 and a cover 3 detachably secured together by means of spring clips 4, of which only one is shown in the drawing.

The base 2 has extending downwardly therefrom a central neck tube 5 which is adapted to be secured to the air intake tube 6 of an internal combustion engine, as by means of a band clamp 7. The base 2 and the cover 3 have shoulders 8, 9 respectively impressed therein to locate within the housing 1 a tubular air filter 10 the opposite ends of which are clamped against and sealed to the surfaces of the base and cover members 2, 3 adjacent said shoulders.

The cover 3 has extending from the side wall thereof an air intake pipe 11 by which atmospheric air is drawn into the housing 2, 3 from whence it passes through the filter element 10 to the intake tube 6 of the engine.

Extending around the filter air intake pipe 11 adjacent its junction with the cover 3 is a condensor chamber 12 formed by a casing 13 which extends around and is spaced from the air intake pipe 11 and is secured thereto, as by welding, so as to form a closed chamber which is in communication with the space within the air intake pipe 11 by means of an opening 14 in the upper part of the pipe. Depending from the lower part of the condensor chamber casing 13 is an intake pipe 15 which is adapted to be placed in communication with the crankcase of the engine, for example by means of a flexible tube 16 one end of which is connected as shown to the intake pipe 15 of the condensor chamber 12 and the other end of which is connected to an opening in the engine valve rocker cover (not shown) so that crankcase fumes from the engine can pass by way of the valve rocker cover, the flexible tube 16 and the intake pipe 15 into the condensor chamber 12. The condensor chamber 12 is preferably filled, as shown, with wire mesh 17 or like material.

In use, crankcase blowby fumes from the engine are drawn by way of the flexible tube 16, and the intake pipe 15 into the condensor chamber 12 from which they pass by way of the opening 14 in the wall of the air filter intake pipe 11 to the interior of the air filter housing 2, 3 and then pass through the filter element 10 and into the engine air intake pipe 6.

During passage through the condensor chamber 12 vaporised oil in the crankcase blowby fumes tends to condense in the condensor chamber, this action being assisted by the wire mesh material with which it is packed, the crankcase blowby fumes thereby being substantially freed of oil before they encounter the air filter element 10. Oil which condenses within the condensor chamber 12 can drain back into the engine by way of the pipe 15 and tube 16.

The passage of relatively cold ambient air through the filter intake pipe 11 ensures that the condensor chamber 12 is maintained at a low temperature relative to the temperature of the incoming crankcase fumes and thus assists the condensation of oil vapour from the fumes.

We claim:

1. An internal combustion engine air filter, comprising a filter housing including a cover member and a base member detachably connected together; an air intake pipe extending from said housing, an outlet tube extending from said housing, said outlet tube being adapted for connection to an air intake conduit of the engine; an air filter element secured in said housing with opposite sides of the element respectively in communication with said filter intake pipe and outlet tube; a casing surrounding said intake pipe to form therewith a closed condensor chamber in communication with said intake pipe by a hole in the upper part of said intake pipe; an intake pipe depending from said casing and in communication with said condenser chamber, said casing intake pipe being adapted for connection to the engine to receive crankcase fumes therefrom; and a mass of wire mesh packed in said condensor chamber.

2. An internal combustion engine air filter having a filter element, an air intake conduit through which intake air is delivered to the filter element and condensor chamber means forming a passage through which engine crankcase fumes may be delivered to the inlet side of said filter element, said condensor chamber means surrounding a portion of said air intake conduit and being arranged in heat excahnge relation therewith such that intake air passing through the air intake conduit assists in cooling the condensor chamber so as to condense vaporized oil in the crankcase fumes passing therethrough.

3. An internal combustion engine air filter as defined in claim 2 wherein said condensor chamber has an inlet opening arranged for connection with the crankcase of an engine to receive crankcase fumes therefrom, said inlet opening being located toward the bottom of said condensor chamber such that condensed oil may be drained therethrough for return to the engine crankcase.

4. An internal combustion engine air filter as defined in claim 3 wherein said condensor chamber is packed with wire mesh to aid in condensing vaporized oil in the crankcase fumes.

References Cited

UNITED STATES PATENTS

| | | |
|---|---|---|
| 1,856,527 | 5/1932 | Winslow. |
| 3,246,639 | 4/1966 | Oliver. |
| 3,250,263 | 5/1966 | Gerjets. |
| 3,313,281 | 4/1967 | Schneider. |

AL. L. SMITH, *Primary Examiner.*